United States Patent [19]

Bausch

[11] Patent Number: 4,930,345
[45] Date of Patent: Jun. 5, 1990

[54] SYSTEM FOR CHECKING SEALS IN A PACKAGING PLANT

[75] Inventor: Franz-Hubert Bausch, Wuppertal, Fed. Rep. of Germany

[73] Assignee: Hamba Maschinenfabrik Hans A. Muller GmbH & Co. KG, Wuppertal, Fed. Rep. of Germany

[21] Appl. No.: 191,288

[22] Filed: May 6, 1988

[30] Foreign Application Priority Data

May 14, 1987 [DE] Fed. Rep. of Germany ....... 3716095

[51] Int. Cl.⁵ ............................................. G01M 3/36
[52] U.S. Cl. ...................................... 73/45.4; 73/49.3
[58] Field of Search ........................... 73/49.3, 45.4, 52

[56] References Cited

U.S. PATENT DOCUMENTS

| | | |
|---|---|---|
| 3,261,465 | 7/1966 | Haller . |
| 3,847,014 | 11/1974 | Mistarz ................................. 73/49.3 |
| 4,024,956 | 5/1977 | Cassidy ............................. 73/49.3 X |
| 4,706,494 | 11/1987 | Creed et al. ........................ 73/49.3 |
| 4,730,482 | 3/1988 | Cerny et al. ........................ 73/49.3 |
| 4,747,299 | 5/1988 | Fox et al. ............................ 73/49.3 |

FOREIGN PATENT DOCUMENTS

| | | |
|---|---|---|
| 2837997 | 3/1980 | Fed. Rep. of Germany . |
| 3528248 | 2/1987 | Fed. Rep. of Germany . |
| 0044637 | 3/1984 | Japan ................................. 73/49.3 |
| 0137534 | 6/1987 | Japan ................................. 73/49.3 |

Primary Examiner—Hezron E. Williams
Assistant Examiner—Joseph W. Roskos
Attorney, Agent, or Firm—Herbert Dubno; Andrew Wilford

[57] ABSTRACT

The seal of a package comprising a cup containing a liquid or semiliquid substance and having a rim to which a flexible cover is sealed is checked by simultaneously monitoring the position of the cover, inwardly elastically deflecting at least one of the walls of the cup so that the disk is bulged outward only when the cup is sealed, and generating an output based on the monitored position of the disk when the disk is bulged outward. The cup is held substantially stationary while monitoring the cover-disk position and inwardly deflecting the one wall, although normally diametrically opposite side walls are simultaneously and oppositely inwardly deflected. The position of the cover disk is monitored by pressing a bumper against it resiliently and detecting movement of the bumper.

17 Claims, 5 Drawing Sheets

SYSTEM FOR CHECKING SEALS IN A PACKAGING PLANT

FIELD OF THE INVENTION

The present invention relates to a system for checking the seals on covers in a packaging plant. More particularly this invention concerns the seal around a foil used to cover a cup of a foodstuff.

BACKGROUND OF THE INVENTION

Yoghurt, pudding, butter, and other semiliquid materials, typically foodstuffs, are normally packaged in a cup having a circular upper edge that is sealed to the periphery of a circular foil disk. The filling and sealing are done under substantially sterile conditions so that the hermetically packed material will not spoil unless opened. Typically the cup is made of a thermoplastic synthetic resin and the foil cover is coated with a thermoplastic resin to allow ultrasound or the like to be used to weld the two together. Such a package can be made at very low cost yet can provide a sealed sterile containment for the foodstuff.

In a standard mass-production packaging operation, which for instance can be producing 25,000 to 33,000 such packages per hour, it is inevitable that some of the cover disks will not be sealed perfectly to the respective cups. The covers can themselves be torn or otherwise perforated, and something such as for instance the foodstuff being packaged can have gotten on the rim and prevented the cover from being sealed at this location. As such an imperfect seal can permit the product to spoil, it is essential to cull out any packages that do indeed have imperfect seals.

U.S. Pat. No. 4,730,482 of Cerny discloses a cover-checking device. In this arrangement a heated plunger is pressed pneumatically with a predetermined fixed force against the cover to be tested. The heat of the plunger is transmitted through the cover to the air trapped underneath it, and this air expands. If the package is perfectly sealed the result is a lifting of the cover or at least increased force pushing the plunger up. If the package has a leak the heated air escapes and there is no change in pressure on or position of the cover disk. In a motion-detecting arrangement a highly sensitive fiber-optical position detector associated with the plunger can detect the tiny, 0.5 mm to 1.0 mm, displacement caused by the heated air in the container and can therefore distinguish between sealed and leaky packages.

This system has several considerable disadvantages, the main one being that it is very slow. The time necessary to move the equipment into place and then heat the air in the container enough to get a measurable reaction is considerable. In a large mass-production packaging plant where the packages move eight abreast along the conveyor line this type of bottleneck is a considerable problem. Also, some foods like butter cannot be subjected to the heat, and some inks used on the cover foils are similarly sensitive to heat. Finally this type of device cannot be used at all with products like pudding that are already hot.

German patent document No. 2,837,997 of M. Gauchel describes a method of testing the airtightness of a container by measuring its size while internally pressurizing it. This principle is hard to apply to food containers as any simple procedure for internally pressurizing the sealed container would inherently compromise the seal.

OBJECTS OF THE INVENTION

It is therefore an object of the present invention to provide an improved method of and apparatus for checking the seals of containers in a packaging plant.

Another object is the provision of such a method of and apparatus for checking the seals of containers in a packaging plant which overcomes the above-given disadvantages, that is which is simple and fast and that effectively distinguishes between sealed and leaky containers.

SUMMARY OF THE INVENTION

According to this invention the seal of a package comprising a vessel containing a liquid or semiliquid substance and having a rim to which a flexible cover is sealed is checked by simultaneously monitoring the position of the cover disk, inwardly elastically deflecting at least one of the walls of the vessel so that the disk is bulged outward only when the vessel is sealed, and generating an output based on the monitored position of the disk when the disk is bulged outward.

Thus with the system of this invention the elastic flexibility of the vessel itself is exploited to reduce the volume of the sealed package below the cover and thereby, presuming the package does not leak, bulge out the flexible cover. This can be done very rapidly without harming the package, will not thermally stress the contents, and is extremely simple to carry out in practice. At the same time this method produces an accurate result, effectively determining if there is anything that would leak, even a hole in the vessel.

According to this invention the vessel is held substantially stationary while monitoring the cover-disk position and inwardly deflecting the one wall. In addition diametrically opposite side walls are simultaneously and oppositely inwardly deflected.

According to this invention the position of the cover disk is monitored by pressing a bumper against it resiliently and detecting movement of the bumper. The fact that the walls of the container can be flexed somewhat with no harm to them at all and that the foil readily bulges without losing its seal makes the method of this invention particularly effective.

Thus the apparatus of this invention includes a conveyor for positioning the vessel in a checking station, some kind of sensor at the station for monitoring the position of the cover disk, at least one pusher for inwardly elastically deflecting at least one of the walls of the vessel so that the disk bulges outward when the vessel is sealed but does not when the vessel is leaky, and a controller connected to the pushers for generating an output based on the monitored position of the disk when the disk bulges outward. The conveyor of this invention is formed by an element itself formed with a succession of seats extending in a horizontal transport direction of the conveyor and each adapted to receive a respective vessel. This conveyor element is displaced such that the seats pass successively through the checking station in the transport direction. The vessel has a rim that is held horizontally by the seat in the station and normally two such pushers move oppositely against opposite side walls of the vessel. The transport direction is generally perpendicular to the movement direction of the pushers.

In accordance with a particularly simple and effective system of this invention each pusher is a horizontal bar having a rounded edge engageable with the vessel. In this system the conveyor element defines a plurality of rows of such seats extending in the transport direction and one such checking apparatus is provided for each such row of seats and forms therefor a slot extending in the transport direction. Each pair of pusher bars flanks the respective slot. In addition respective parallelogrammatic linkages carrying the bars each have a link fixed to a respective link of the linkage of the adjacent slot so that the bars move synchronously. Furthermore there is a coupling link pivoted to and interconnecting all the parallelogrammatic linkages for joint synchronous movement. There is a single actuator connected to one of the linkages and through the link to all the other linkages for joint operation of all the pusher bars. Each pusher bar is long enough to engage the containers of at least two succeeding seats in the same seat row of the conveyor element.

According to this invention a vertically movable support at the station carries the pusher for movement between an upper position unengageable with the cover of a vessel in the station and a lower position engageable therewith. A holddown element on the support is engageable only in the lower position of the support with a substantially stationary support under the conveyor element in the station. This holds the conveyor down against the support so that an accurate base position is established for the vessels as they are being checked.

DESCRIPTION OF THE DRAWING

The above and other objects, features, and advantages will become more apparent from the following, reference being made to the accompanying drawing in which.

SPECIFIC DESCRIPTION

Figure 1:
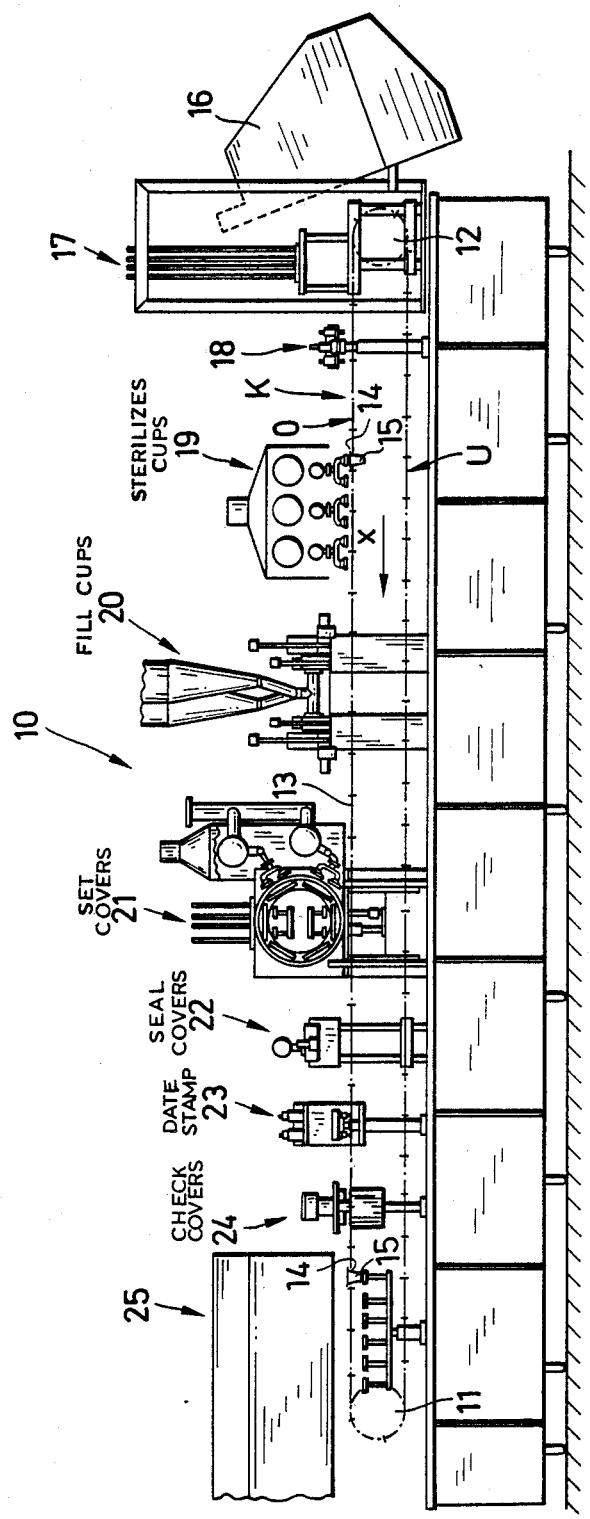
FIG. 1 is a small-scale side view of a packaging apparatus according to this invention.

As seen in FIG. 1 a yoghurt packaging system 10 has a throughgoing endless conveyor chain K with an upper stretch O and a lower stretch U spanned over upstream and downstream sprockets 11 and 12. The chain K is comprised of a succession of link plates 13 each formed with a row of eight seats 14 which in the upper stretch hold respective filled cups 15. The cups 15 advance in a transport direction x (right to left in FIG. 1 and perpendicular to the view planes in FIGS. 2 and 3) eight abreast through the machine 10.

A picker device 17 pulls the cups 15 from a supply 16 and fits them to the seats 14 at the extreme upstream end of the upper stretch U of the belt K. The cups 15 pass through a device 18 that picks out doubled cups and fills in where cups are missing, then they pass through an apparatus 19 that sterilize them with hydrogen peroxide or the like. Subsequently the cups 15 are filled downstream of the picker 17 by a machine 20 which here deposits yoghurt 27 (see FIGS. 2 and 3) into each cup 15. Cover disks 39 (see FIGS. 2 and 3) are set atop the filled and sterilized cups by a device 21 and a further apparatus 22 seals the covers 39 to rims 26 (FIGS. 2 and 3) of the cups 15. The date is stamped on the sealed covers by a printer 23. The seal of each cup 15 and cover 39 is then tested according to this invention by an apparatus 24 and finally an unloader 25 takes the packages off the conveyor chain K, automatically culling out those packages found to have imperfect seals, that is the packages where the disk 39 and cup 15 do not form a perfectly hermetically closed space.

This system operates in steps with sixteen cups being filled, sterilized, and so on each time the chain K stops. Such a machine can be operated to produce 33,600 packages per hour, so that the machine cycles about 35 times per minute, or better than one cycle every 2 seconds. As mentioned above, the typical bottleneck in a packaging plant is the seal-testing device, which normally cannot function effectively at this rate so that it must work on 32 or 64 packages at a time and/or travel with the packages.

Figure 2:
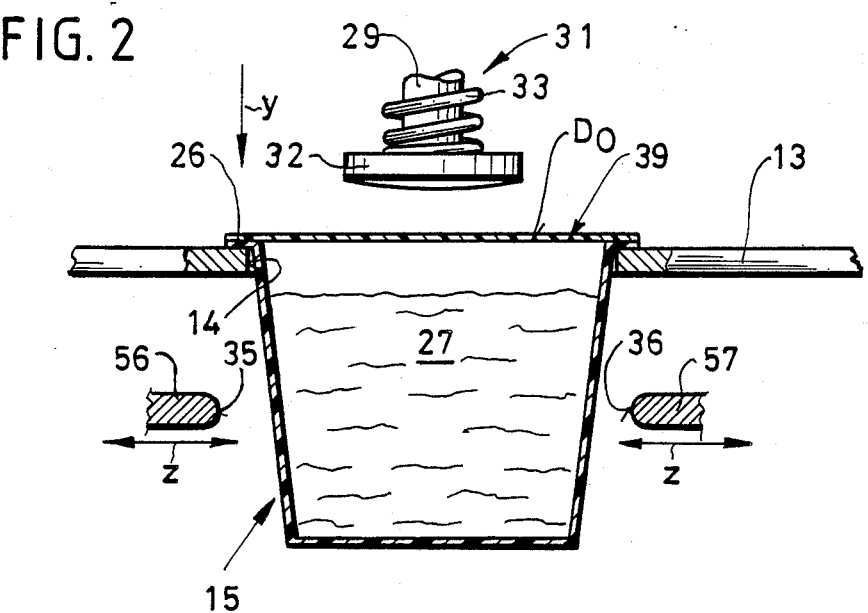
FIGS. 2 and 3 are larger-scale side sectional views illustrating the method and apparatus of this invention.
Figure 3:
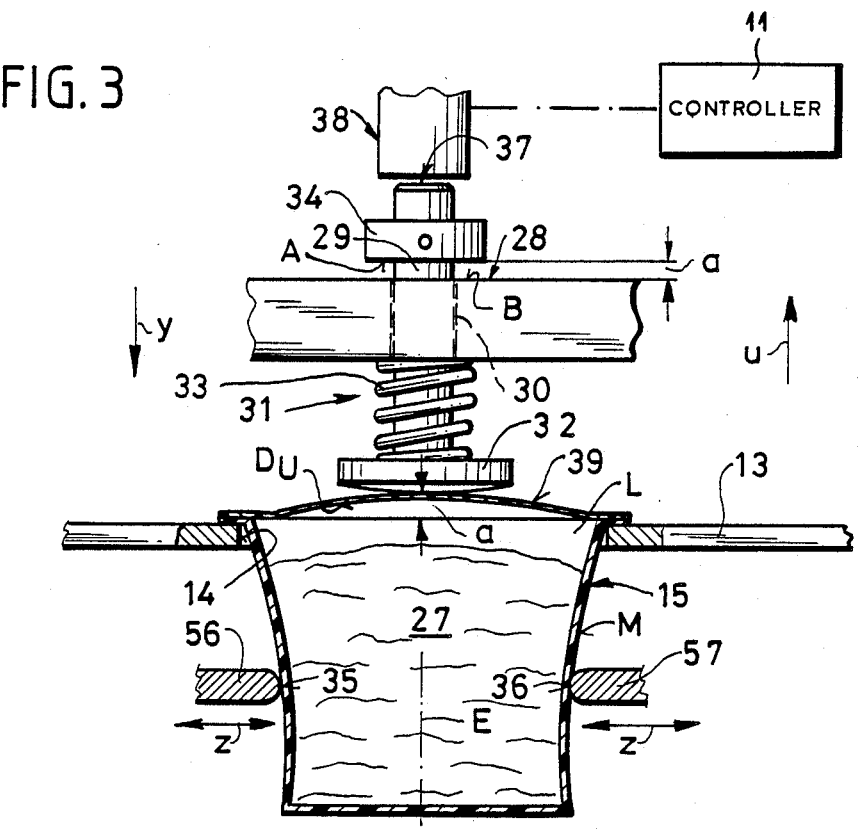

FIGS. 2 and 3 show how the improved seal-checking machine 24 according to this invention works. Each cup 15 has a frustoconical side wall and a planar circular bottom all centered on a normally upright axis E. The rim 26 is circularly planar and coaxial and sits atop the chain link 13 outside the respective circular seat hole 14. The cup 15 is made of an inexpensive thermoplastic resin and the cover 39 is of aluminum foil with a plastic-coated outer periphery that is bonded by the machine 22 to the rim 26, normally by ultrasonic welding.

The machine 24 according to this invention has a vertically reciprocal support 28 that moves up and down synchronously with the steps of the chain K and that carries two rows of eight sensors 31. Each such sensor 31 has a stem rod 29 that is vertically slideable in a respective bore 30 of the support plate 28 and is provided with a downwardly part-spherically rounded bumper 32 at its lower end. When in position the vertical axis of each rod 29 lies on the axis E of the respective underlying cup 15. A relatively weak coil spring 33 surrounds each stem 29 and is braced downward against the respective bumper 32 and upward against the lower surface of the plate 28 at the respective bore 30. Above the plate 28 each stem 29 carries a fixed ring 34 having a lower surface A that is normally is pressed downward against the upper surface B of the plate 28 by the respective spring 33. Each stem 29 has an upper end 37 that moves axially vertically relative to a respective inductive or capacitive proximity sensor 38 that is fixed relative to the support plate 28 and that is in turn connected to a controller 11 that itself is connected to the various machines 17, 18, 19, 20, 21, 22, 23, and 25 also.

In addition the machine 24 is provided at each of its sixteen testing stations with a pair of pushers 35 and 36 movable horizontally oppositely toward and away from each other as indicated by arrows z diametrally of the respective cup axis E and perpendicular to the transport direction x.

This system operates as follows:

I. As soon as a filled and covered cup 15 comes to a halt underneath the respective bumper 32, the support plate 28 drops down to set the bumper just in contact with the upper surface $D_O$ so that the surfaces A and B remain in light contact with each other.

II. The two pushers 35 and 36 are then pressed diametrically against an outer surface M of the cup 15, deflecting the sides of the cup 15 elastically inward, that is not so far but that they do not return to their starting positions. This inward deflection of the cup's sides forces the top surface of the yoghurt mass 27 upward, as it is substantially incompressible, thereby compressing the air L captured in the container above the filling 27 and pressing it up against the lower surface $D_U$ of the lid 39 so that it bulges up in direction u through a displacement a. The use of two oppositely effective pushers 35 and 36 prevents this movement from actually displacing the package from its seat 14. Such displacement of the cover 39 will be transmitted to the plunger-type sensor 31 whose proximity sensor 38 will respond, indicating to the controller 11 that this particular package is sealed. If the package leaks the air mass A will not be pressurized, and the cover 39 will not bulge up. In this case the sensor 31 is not lifted so that the controller 11 will mark the leaky package and have the takeoff device 25 cull it out.

III. Once the cover check is complete, the pushers 35 and 36 move out of contact with the cup 15 so it resumes its normal shape with the cover 39 planar, and the support 28 is lifted in direction u to pull the sensor 31 up out of contact with the package. The conveyor chain K then steps another sixteen containers into the seal-checking device 24 and the above-described steps are repeated.

Figure 4:
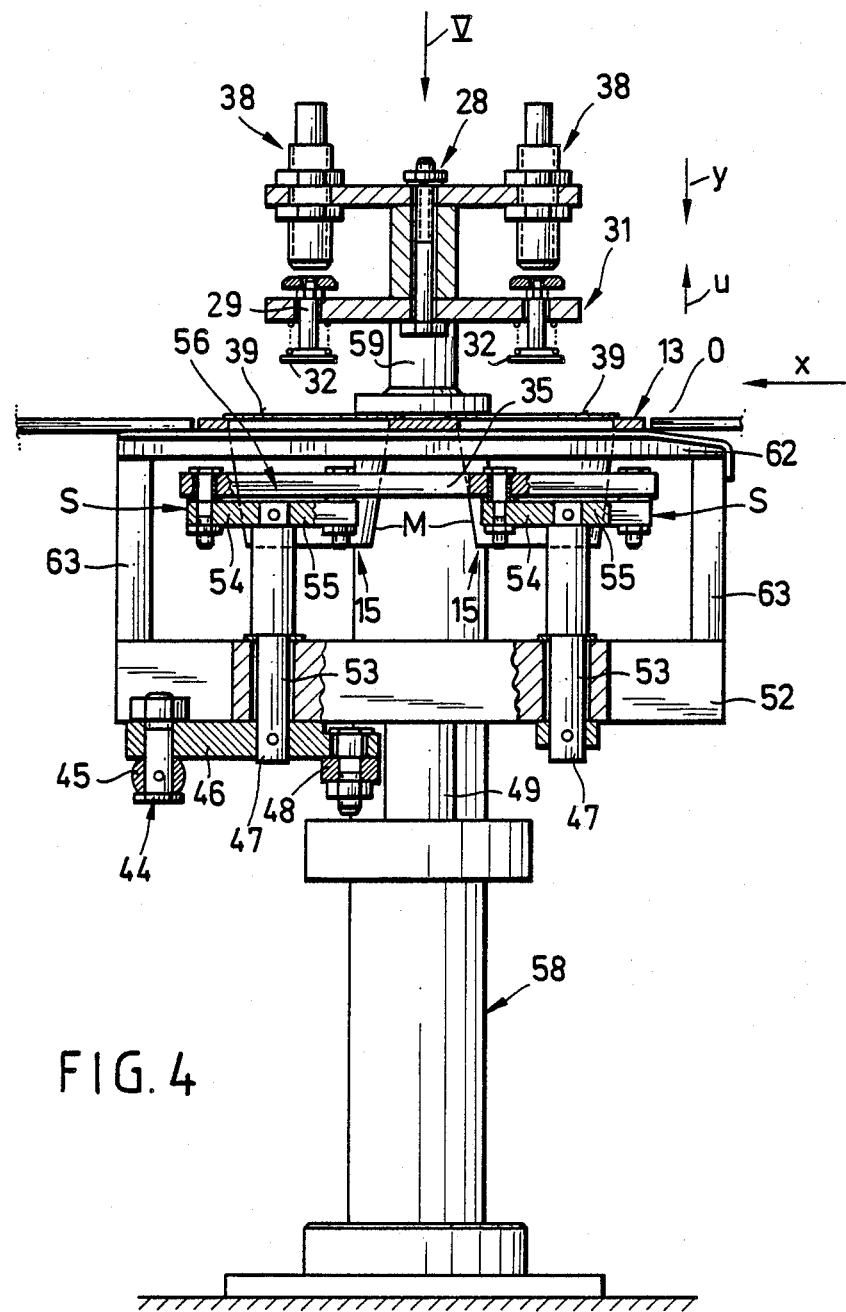
FIG. 4 is a large-scale side view partly in vertical section through the subassembly indicated at IV in FIG. 1.
Figure 5:
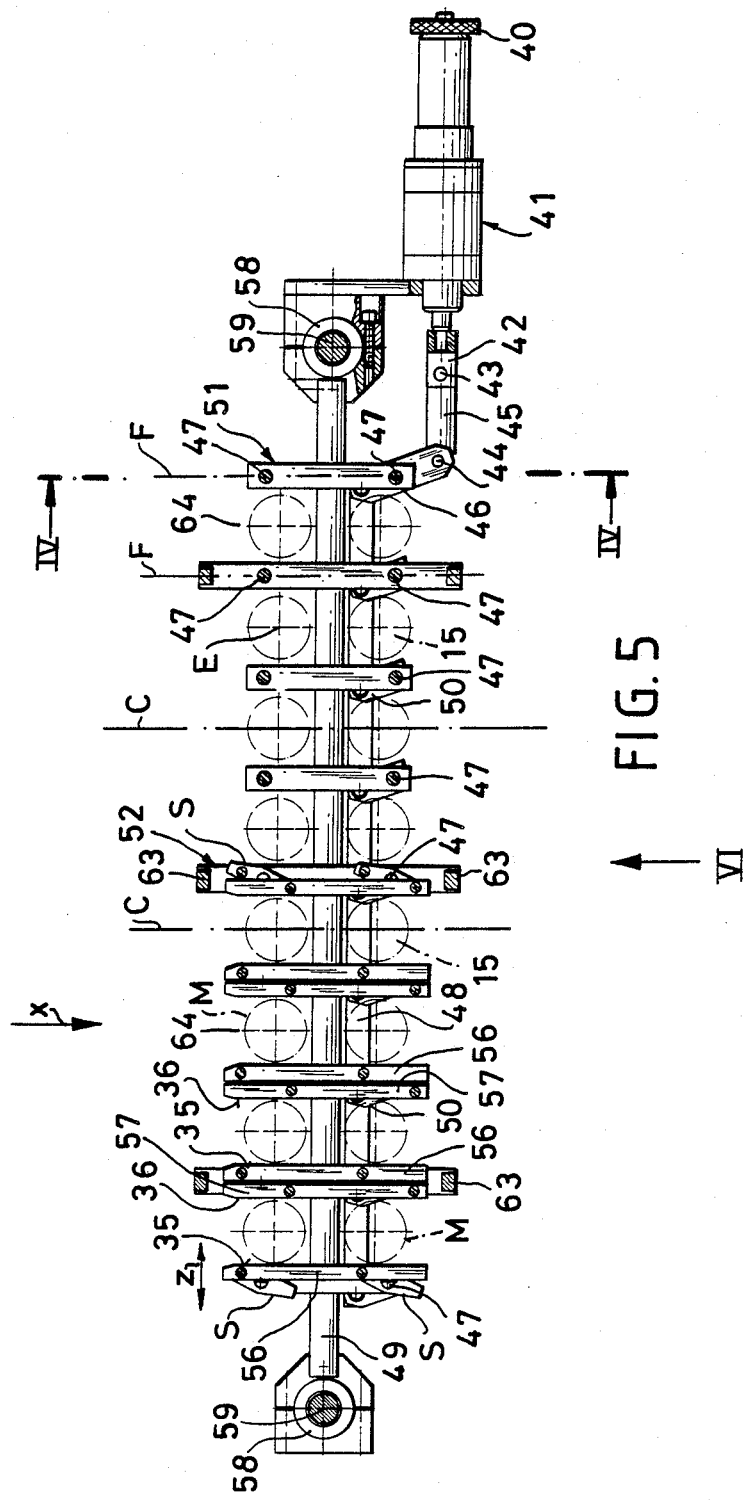
FIG. 5 is a small-scale top view taken in the direction of arrow V in FIG. 4, section line IV—IV indicating the section plane for FIG. 4.
Figure 6:
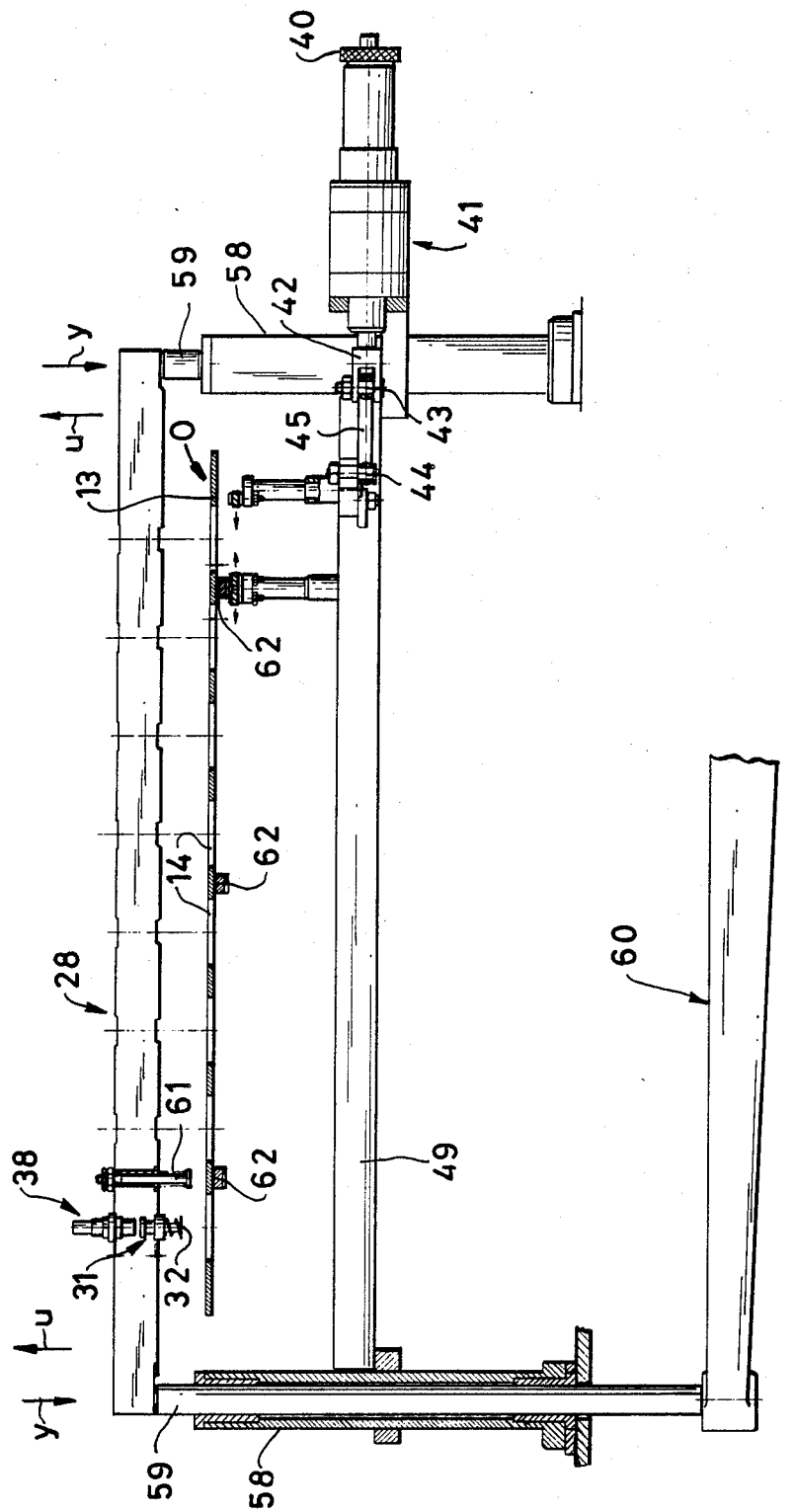
FIG. 6 is a side view partly in vertical section taken in the direction of arrow VI of FIG. 5 and with parts left out for clarity.

As seen in FIGS. 4 through 6 the basic actuator responsible for moving the two pushers 35 and 36 at each cover-checking station of the machine 24 is a pneumatic cylinder 41 whose end position is controlled by a set wheel 40, which is fixed horizontally on one side post 58 of the machine 24, and which has a piston rod 42 movable horizontally perpendicular to the direction x below the path of the cups 15 in their seats 14. A horizontal link 45 is connected to a vertical pivot 43 on the piston rod 42 and to the outer end of a two-arm lever 46 fixed on the lower end of a vertical pivot pin 47 located at one lateral end of a row of nine such rods 47 each paired with another such upstream rod 47. The pairs of rods 47 are journaled in short or long support bars 51 and 52 fixed on the columns 58 and defining eight slots 64 open in the direction x and each traversed in this direction by a respective row of the filled and sealed containers. Arms 50 fixed on the lower end of each of the downstream rods 47 extend parallel to the lever 46 and are interconnected below the upper stretch O by a connecting rod 48 also connected to this lever 46. Thus as the lever 46 is pivoted by the actuator 41, all of the downstream rods 17 will be identically pivoted.

The upper end of each rod 47 carries a lever S having a pair of arms 54 and 55 and all extending parallel to one another. Relative to each slot 64, each arm 54 is connected to a respective end of a bar 56 and each arm 55 to a bar 57, these bars 56 and 57 forming the pushers 35 and 36. Thus each pair of bars 55 and 56 flanks and effectively defines one slot 64 normally accommodating two packages. In addition each arm 54 of each support 51 or 52 defines with the other arm of the same support 51 or 52 and with the respective bar 56 a parallelogrammatic linkage, as do the arms 55 with their supports 51 or 52 and bars 57 so that these bars 56 and 57 will remain parallel to one another and to the direction x as the rods 47 pivot.

Thus as the cylinder 41 expands the bars 56 and 57 will move in the pushers 35 and 36 to a position determined by the wheel 40 and will elastically inwardly deflect the cup walls as described above. The wheel 40 establishes the end positions of all the pushers 35 so that a single adjustment is needed when container size or shape changes.

In addition FIGS. 4 through 6 illustrate how the longer support bars 52 that lie between the first and second, fourth and fifth, and seventh and eighth slots 64 have ends provided with short upright posts 63 that support bars 62 that extend in the direction x just underneath the chain links 13 and that in fact support the upper chain stretch O between the respective slots 64. In addition the plate 28 that carries all the sensors 31 is fixed at each side of the apparatus to columns 59 interconnected at their lower ends by a beam 60 and this plate 28 also carries downwardly projecting pushers 61 aligned vertically with the bars 63. When the plate 28 is dropped to touch the bumpers 32 on the foils 39, the pushers 61 press the chain links 13 solidly down on the bars 62, ensuring that the containers are positioned vertically in exact positions so that no false readings are obtained.

I claim:

1. In a packaging process where a succession of vessels are filled and each filled vessel has a rim to which is sealed a flexible cover disk, a method of checking the package seal comprising the steps of simultaneously:
    (a) supporting said succession of filled vessels by respective rims so that bodies of the filled vessels hang freely downwardly below supported portions of the vessels;
    (b) advancing said vessels suspended at said portions in succession to a checking location; and
    (c) at said location and in succession for the vessels monitoring the position of each cover disk of the respective vessels, inwardly elastically deflecting at least one of the walls of each vessel at the body thereof below the respective supported position during monitoring of the position of the respective cover disk and thereby decreasing the volume defined within the vessel, whereby the disk thereof is bulged outward above the respective supported location only when the vessel is sealed, and
    generating an output based on the monitored position of the disk the respective disk is bulged outward.

2. The seal-checking method defined in claim 1, further comprising the step of
    holding the vessel substantially stationary while monitoring the cover-disk position and inwardly deflecting the one wall.

3. The seal-checking method defined in claim 2 wherein diametrically opposite side walls are simultaneously and oppositely inwardly deflected.

4. The seal-checking method defined in claim 2 wherein the position of the cover disk is monitored by pressing a bumper against it resiliently and detecting movement of the bumper.

5. In a packaging system wherein a filled vessel has a rim to which is sealed a flexible cover disk, an apparatus for checking the package seal and comprising:
    a conveyor having means suspending said vessel at a supported portion adjacent said rim so that a body of said vessel is freely suspended below said portion, said conveyor being displaceable for positioning the vessel in a checking station with said body of the vessel freely suspended below said supported portion;

means at the station for monitoring the position of the cover disk;

means including at least one pusher for inwardly elastically deflecting at least one of the walls of said body of the vessel below said supported portion and thereby decreasing the volume defined within the vessel, whereby the disk bulges outward above said supported portion when the vessel is sealed but does not when the vessel is leaky; and control means connected to the pusher means for generating an output based on the monitored position of the disk when the disk bulges outward.

6. The seal-checking apparatus defined in claim 5 wherein the conveyor means includes a conveyor element formed with a succession of seats extending in a horizontal transport direction of the conveyor means and each adapted to receive a respective vessel; and means for displacing the element with the seats passing successively through the checking station in the transport direction.

7. The seal-checking apparatus defined in claim 6 wherein the vessel has a rim that is held horizontally by the seat in the station and two such pushers move oppositely into opposite side walls of the vessel.

8. The seal-checking apparatus defined in claim 7 wherein the transport direction is generally perpendicular to the movement direction of the pushers.

9. The seal-checking apparatus defined in claim 7 wherein each pusher is a horizontal bar.

10. The seal-checking apparatus defined in claim 9 wherein the bars have rounded edges engageable with the vessel.

11. The seal-checking apparatus defined in claim 9 wherein the conveyor element defines a plurality of rows of such seats extending in the transport direction and one such checking apparatus is provided for each such row of seats and forms therefore a slot extending in the transport direction, each pair of pusher bars flanking the respective slot.

12. The seal-checking apparatus defined in claim 11 wherein the pusher means includes respective parallelogrammatic linkages carrying the bars.

13. The seal-checking apparatus defined in claim 12 wherein each such parallelogrammatic linkage has a link fixed to a respective link of the linkage of the adjacent slot, whereby the bars move synchronously.

14. The seal-checking apparatus defined in claim 13 wherein the pusher means includes a link pivoted to and interconnecting all the parallelogrammatic linkages for joint synchronous movement.

15. The seal-checking apparatus defined in claim 14 wherein the pusher means includes a single actuator connected to one of the linkages and through the link to all the other linkages for joint operation of all the pusher bars.

16. The seal-checking apparatus defined in claim 11 wherein each pusher bar is long enough to engage the containers of at least two succeeding seats in the same seat row of the conveyor element.

17. In a packaging system wherein a filled vessel has a rim to which is sealed a flexible cover disk, an apparatus for checking the package seal and comprising:

a conveyor having means suspending said vessel at a supported portion adjacent said rim so that a body of said vessel is freely suspended below said portion, said conveyor being displaceable for positioning the vessel in a checking station with said body of the vessel freely suspended below said supported portion;

means at the station for monitoring the position of the cover disk;

means including at least one pusher for inwardly elastically deflecting at least one of the walls of said body of the vessel below said supported portion and thereby decreasing the volume defined within the vessel, whereby the disk bulges outward above said supported portion when the vessel is sealed but does not when the vessel is leaky;

control means connected to the pusher means for generating an output based on the monitored position of the disk when the disk bulges outward, said conveyor including:

a conveyor element formed with a succession of seats extending in a horizontal transport direction of the conveyor means and each adapted to receive a respective vessel, and means for displacing the element with the seats passing successively through the checking station in the transport direction;

a vertically movable support at the station and carrying the pusher for movement between an upper position unengageable with the cover of a vessel in the station and a lower position engageable therewith;

a substantially stationary support under the conveyor element in the station; and a hold-down element on the support engageable only in the lower position of the support with the element to hold it down against the support.

* * * * *